United States Patent [19]
Liu

[11] Patent Number: 6,058,482
[45] Date of Patent: May 2, 2000

[54] APPARATUS, METHOD AND SYSTEM FOR PROVIDING NETWORK SECURITY FOR EXECUTABLE CODE IN COMPUTER AND COMMUNICATIONS NETWORKS

[75] Inventor: James C. Liu, Sunnyvale, Calif.

[73] Assignee: Sun Microsystems, Inc., Palo Alto, Calif.

[21] Appl. No.: 09/084,444

[22] Filed: May 22, 1998

[51] Int. Cl.$^7$ .................................................. G09C 01/06
[52] U.S. Cl. .......................... 713/201; 713/151; 713/164; 713/166; 713/167
[58] Field of Search ..................................... 713/201, 151, 713/164, 165, 166, 167, 190, 193, 200

[56] References Cited

U.S. PATENT DOCUMENTS

| | | | |
|---|---|---|---|
| 4,864,494 | 9/1989 | Kobus, Jr. ................................ | 713/200 |
| 5,305,456 | 4/1994 | Boitana .................................... | 713/200 |
| 5,311,591 | 5/1994 | Fischer ....................................... | 380/4 |
| 5,412,717 | 5/1995 | Fischer ....................................... | 380/4 |
| 5,940,590 | 8/1999 | Lynne et al. ............................. | 713/200 |

*Primary Examiner*—Thomas R. Peeso
*Attorney, Agent, or Firm*—Conley, Rose & Tayon, PC; B. Noel Kivlin

[57] ABSTRACT

An apparatus, method and system are disclosed for providing network security for executable code in computer and communications networks, such as providing network security for downloadable and executable Java programming language bytecode. The preferred apparatus embodiment includes a network interface for the reception and transmission of network information, such as an interactive world wide web page; and includes a processor having program instructions to determine whether network information includes a network language keyword, such as a Java applet. When the network information includes such a network language keyword, the processor includes further instructions is further responsive to generate the network language keyword having a distinctive reference to corresponding executable code, such as a distinctive Java class name, and to provide, for transmission by the network interface, the network information in which the network language keyword incorporates the distinctive reference. When the network language keyword incorporating the distinctive reference is invoked, the processor includes further instructions to provide, for downloading by the network interface, the corresponding executable code. The preferred apparatus embodiment is within a network server, and may also include a memory system for storage of the corresponding executable code.

19 Claims, 5 Drawing Sheets

APPARATUS, METHOD AND SYSTEM FOR PROVIDING NETWORK SECURITY FOR EXECUTABLE CODE IN COMPUTER AND COMMUNICATIONS NETWORKS

FIELD OF THE INVENTION

The present invention relates to establishing and enforcing security functions in networks, such as computer and communications networks. More particularly, the invention relates to an apparatus, method and system for providing network security for executable code in computer or communications networks.

BACKGROUND OF THE INVENTION

Network security is an increasingly important issue for network users, both inside enterprises operating intranets, and for larger or more global data, computer and communications networks, such as the internet and the world wide web. Substantial technology has been developed for providing network security functionality, including access control, protected communications, security assistance and security policy management.

Access control concerns a decision whether a particular user or end system, or user-initiated communication, should be given access to a particular computing or communications resource. For example, certain users or categories of users may be given access to electronic mail (email) functionality, but not to accounting functionality, all of which may be available on the same network, such as a corporate intranet.

Similarly, other security functionality (referred to as protected communications) concerns methods for ensuring that information or other data is not available to unauthorized individuals, e.g., may not be accessed, modified, read or copied by unauthorized users. Other security functionality includes providing support in various network devices for securing other parts of the network system, and managing the actual network data which defines the security policies of the network.

As security measures have evolved, however, security breach tactics have become increasingly clever. Password protection and personal identification numbers ("PIN" numbers) are known security measures which have been utilized to provide physical security of devices such as computers, and to provide access control to computer systems and contents, such as access control over accounts, records, programs, and other sensitive information. Various attempts to circumvent such security measures include a "Trojan Horse" attack, in which (unknown to the user) a rogue program or other application is substituted for a proper program or application. When the user attempts to use the proper program or application, the rogue program or application is executed instead, with concomitant and frequently harmful consequences. Various known "Trojan Horse" attacks utilized by computer "hackers" have included installation of programs that, upon execution, transmit the user's password or account PIN number to the hacker. Such an attack thereby enables a corresponding breach of security of any systems previously protected by the user's password or PIN number, such as a user's bank account.

The Java® language, compiler, interpreter, and overall Java architecture (individually and collectively referred to as "Java" or "Java architecture") has been developed by Sun Microsystems, Inc. ("Sun") for computer and communications networking and other applications. Java is designed to thwart such "Trojan Horse" or other attacks that may originate from a network (i.e., from the network server side of a client-server network). For world wide web ("web") and other internet applications, many current web browsers are Java-enabled (i.e., the web browser includes program instructions for a Java Virtual Machine ("JVM")), which provides for local execution of Java bytecode. When a network user accesses and requests information from a web page using a Java-enabled browser, an executable application or program package referred to as an "applet" or "applet package" may be downloaded in bytecode form to the user end system (the client side of the client-server network). The applet (in bytecode form) is then executed by the JVM of the web browser which, coupled with any data downloaded from the network, provides a locally running application on the user end system. Such locally running applications may include an interactive web page, an interactive game application, or an interactive spreadsheet.

Given that such ultimately foreign program code is downloaded for local execution, there are inherent security issues that could arise and, therefore, which have been addressed and circumvented in advance within the Java architecture. The Java architecture includes security features that prevent such downloaded programs from interfering with the user's private or non-network resources. Referred to as the "Java sandbox", the Java architecture prevents an untrusted or potentially malicious applet (downloaded to the local end system from a remote web server) from reading, writing, or executing private resources, such as the local hard drive. Among other security features, the Java language is a typesafe language, which does not allow pointers to read or write to arbitrary memory locations. In addition, prior to execution of an incoming applet, the applet is run through a Java bytecode verifier, which examines the bytecode for potentially illegal commands, such that only legal applets get executed by the JVM at the local end system. See, e.g., Java Security Whitepaper, available at the Sun web sites java.sun.com and javasoft.com; A. Tanenbaum, *Computer Networks* (Prentice-Hall, 3d ed. 1996), at 718–20; D. Flanagan, *Java in a Nutshell,* (O'Reilly, 2d ed. 1997), at 7, 139–43.

While the Java architecture prevents security breaches originating from a network (or network server), a need remains to be able to thwart potential security breaches that may originate from a local user (i.e., from a local end system or the client side of a client-server network). For example, in the event physical security of a local end system is breached or otherwise compromised, a rogue program or virus may be stored locally at the end system, such as a rogue program for emulating or "spoofing" an applet. A need remains, therefore, to be able to prevent any such locally loaded programs or applets from unknowingly being executed by an innocent user and potentially compromising the network security of the user of such an applet or other program. Such additional security measures also should be capable of being implemented without additional network hardware, should be cost-effective, and should be user transparent.

SUMMARY OF THE INVENTION

The present invention provides for such increased network security against breaches which may originate from a client-side of a network, such as from a local end system in a network of servers and routers, including the internet. This additional security feature is preferably implemented as software or other programming instructions within a network server and, as a consequence, does not require additional network hardware and is cost-effective. In addition, when implemented in a network server embodiment, the present invention is completely transparent to the user, who is not required to perform any additional steps and who, most likely, may be totally unaware of the implementation of this additional security feature.

The method of the present invention begins when a user, at his or her local end system such as a personal or network computer, requests network information. This network information may be a web page, for example. When the remote server receives the request for network information, the remote server determines whether the requested network information should contain keywords which, when invoked, will download executable code. For web pages, for example, the remote server will determine whether the requested web page has an applet tag (as a keyword) which, if invoked by the user, will request that the remote server download Java bytecode to the user.

When the requested network information should contain keywords such as applet tags, the remote server generates keywords having distinctive references to corresponding executable code, and stores the corresponding executable code using the new, distinctive reference. Continuing with reference to Java, for example, an applet tag is generated having a new, distinctive Java class name, and the corresponding applet bytecode is stored under this new class name. The requested network information, such as a web page, is then generated and transmitted to the user, with all keywords (such as applet tags) having distinctive references, such as unique applet class names.

Subsequently, a user may invoke a keyword by, for example, mouse clicking on a graphical user interface of a web page. Unknown or transparent to the user, the keyword invoked now uniquely designates the corresponding code stored only at the remote server. When the remote server receives the request for code as invoked via the user's web browser, the corresponding executable code having the distinctive reference is then downloaded to the user for local execution.

It is highly unlikely, if not impossible, for a "hacker" to know in advance precisely what distinctive reference will be generated in a web page by the remote server and subsequently invoked by the user. If there were a breach of local security and executable code (such as a rogue applet) were stored locally, it will not have been stored under the distinctive reference (which is generated separately and presumably at another time by the remote server). When the keyword having the distinctive reference is subsequently invoked by the user, such as a rogue applet or other executable code (having a different reference) will not be unknowingly executed by the local user. Rather, in accordance with the present invention, only the corresponding code having the distinctive reference will be executed.

The present invention thereby ensures that all such executable code, downloaded from a network, is not "spoofed" or imitated by a locally stored rogue program. Rather, such executable code is freshly downloaded, for each web access, presumably from a known or trusted source directly accessed by the user. As a consequence, the user's network security is preserved, despite a presumed breach of local physical security (which had enabled the rogue code to be stored locally). In addition, in the preferred embodiment, the present invention is embodied within a network server, and all of its operations in generating distinctive references and corresponding code are completely user transparent: the user does not need to enter or use specific commands, codes or passwords, and may not even be aware that this additional security precaution has been implemented.

Numerous other advantages and features of the present invention will become readily apparent from the following detailed description of the invention and the embodiments thereof, from the claims and from the accompanying drawings.

DETAILED DESCRIPTION OF THE INVENTION

As mentioned above, a need remains to eliminate the effects of potential network security breaches that may originate from a local user (i.e., from a local end system or the client side of a client-server network). In the event physical security of a local end system is compromised such that a network language program or application such as an applet is stored locally, then in accordance with the present invention, such a locally loaded program or applet will not be unknowingly executed by an innocent user. As a consequence, presuming a "Trojan Horse" or other rogue program that spoofs an applet were locally installed, despite such a security breach, the present invention prevents such rogue program from potentially compromising the network security of the local user. This additional security feature is preferably implemented as software or other programming instructions within a network server and, as a consequence, does not require additional network hardware and is cost-effective. In addition, when implemented in a network server embodiment, the present invention is transparent to the user, who is not required to perform any additional steps and who, most likely, may be unaware of this additional security feature.

Figure 1:
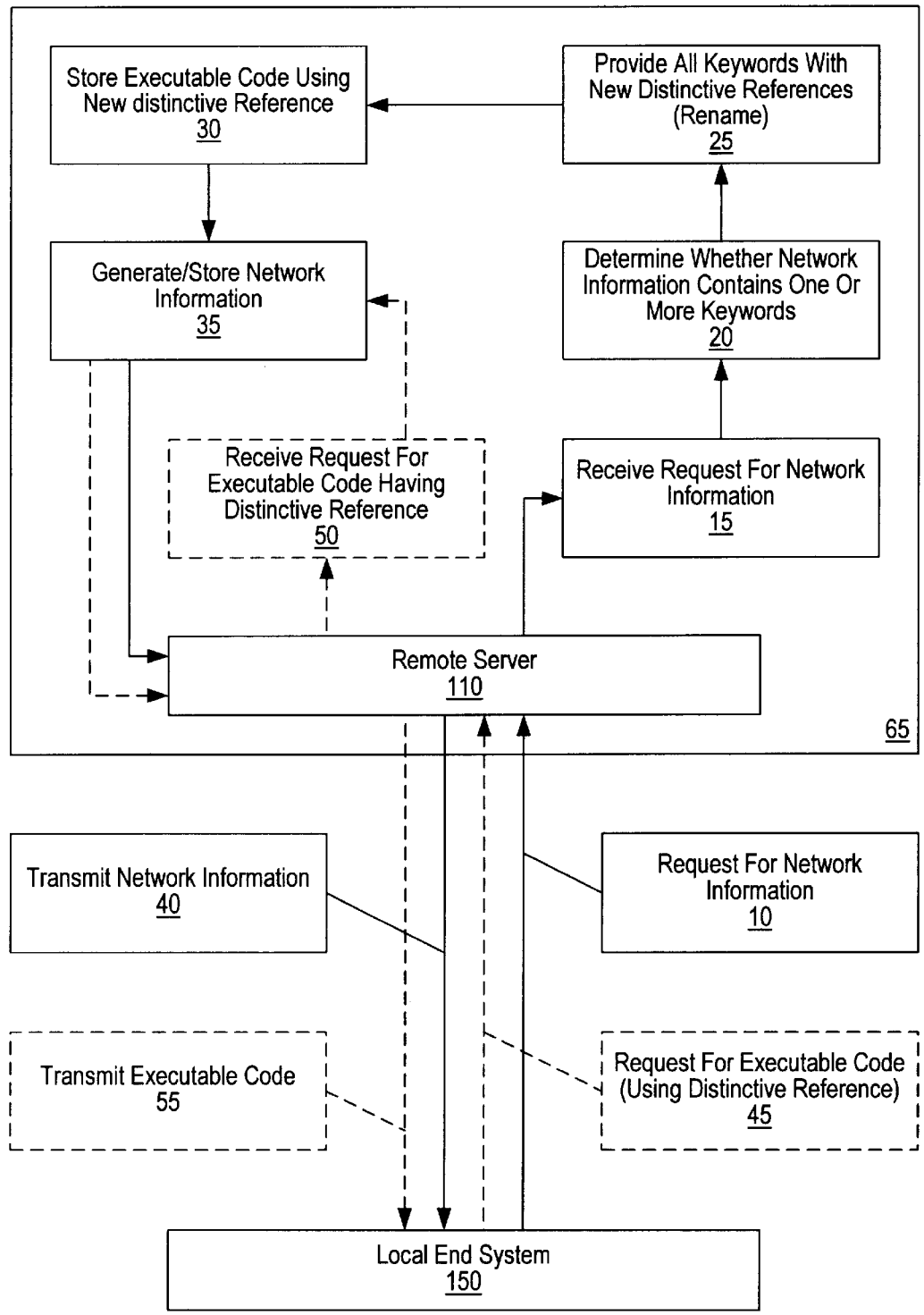
FIG. 1 is a state diagram illustrating a system embodiment in accordance with the present invention.

FIG. 1 is a state diagram illustrating a system embodiment 60, to provide a summary overview of the method and operation of the present invention. As illustrated in FIG. 1, the system embodiment 60 consists of a local end system 150, such as a personal or network computer, and a remote server 110. The remote server 110 is typically part of a remote server system 65, which also includes memory or other storage capability. Also as illustrated in FIG. 1, solid lines and dashed lines are utilized to indicate different time periods, in which the solid lines are an initial time period, and the dashed lines are a subsequent time period.

Referring to FIG. 1, the local end system 150, via a web browser or other internet communications program, transmits a request for network information, state 10, such as a request for a web page. This request is received by the remote server 110, state 15. The remote server 110 then determines whether the requested network information should have one or more keywords, such as applet tags, which are utilized to invoke executable code, state 20. When the network information should have such keywords, the remote server 110 generates the keywords with each keyword having a new, distinctive reference, such as a new Java applet class name, state 25. The executable code corresponding to each such keyword is stored, state 30, within the remote server 110 or within additional memory capacity. The remote server 110 then generates the requested network information with each included keyword having a distinctive reference, state 35, and transmits the network information to the local end system, state 40. Subsequently, the local end system 150 may invoke a keyword, transmitting a request for executable code using or having the distinctive reference, state 45. When the remote server 110 receives the request, state 50, it transmits the corresponding executable code to the local end system 150, state 55.

Figure 2:
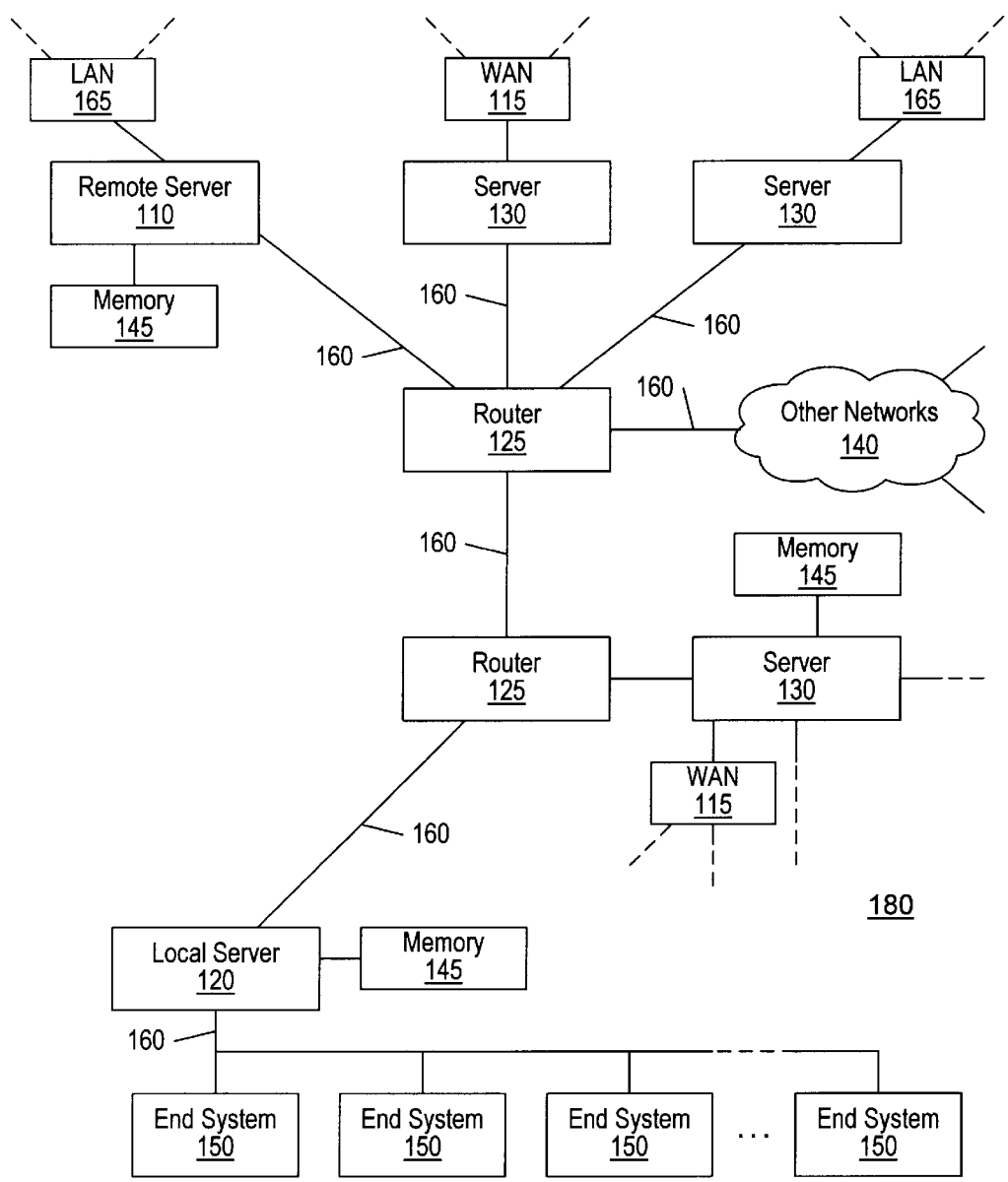
FIG. 2 is a block diagram illustrating a representative network having a system embodiment in accordance with the present invention.

FIG. 2 is a block diagram illustrating a representative network 180 having a system embodiment in accordance with the present invention, such as servers 130 and the more specifically designated remote server 110 and local server 120. As illustrated in FIG. 2, the network 180 includes a plurality of connectable or connected devices and other systems, such as routers 125, servers 130 (and, more particularly, remote server 110 and local server 120), local area networks ("LANs") 165, wide area networks ("WANs") 115, other networks 140, and a plurality of end systems 150. The end systems 150, for example, may include personal computers, engineering workstations, network computers, or other devices capable of a network connection, such as a web television system or a personal digital assistant. The network 180 and other networks 140 may include any type of communications channels 160, such as T1, E1, ISDN, cable or fiber optic lines, and may include any type of network connection, such as circuit-switched or packet-based network connections. For example, the various communications channels 160 may be hybrid fiber-coaxial cable in some locations and twisted pair lines in other locations, while the other networks 140, may include a public (or general) switched telephone network) or a public or backbone internet routing system. The various servers 130, such as remote server 110 and local server 120, typically provide various services to connected end systems 150, LANs 165 and WANs 115, such as file storage, program storage, data bases, and may also provide internet and intranet services. For example, local server 120 may be an internet service provider, providing internet connections to various other servers 130, such as remote server 110. The various other servers 130, such as remote server 110, also for example, may be provided by individuals, businesses or institutions, such as banks, stock brokerages, or any other entity providing web sites or otherwise generating web pages, on-line services, on-line marketing, or on-line sales. The various servers 130, including remote server 110 and local server 120, may also be coupled to or may have additional memory 145 or other storage capacity or access, such as system hard drives or other magnetic or optical storage devices. As discussed in greater detail below, the apparatus and method in accordance with the present invention are preferably embodied within a system such as server 130, a remote server 110, or a local server 120, as illustrated in FIG. 2. Also as discussed in greater detail below with reference to the apparatus embodiments illustrated in FIGS. 5 and 6, the system may also include internal memory capacity or external memory capacity, such as the memory 145 illustrated in FIG. 2.

Through a local server 120, an end system 150, such as a personal computer, may access a web site on the internet, generally utilizing an internet browser application. As mentioned above, such a browser may be capable of executing or running a network programming language such as Java. Typically, through the browser, the end system 150 requests a web page, which is downloaded in packet-based form from a remote server 110 (or another server 130) through local server 120, for display on the end system 150. Such a web page may be created utilizing a standard language such as Hypertext Markup Language ("HTML"), a dynamic HTML, a scripting language such as JavaScript, Perl or Tcl, or any another equivalent language, particularly as boundaries or distinctions may blur between and among markup languages, scripting languages, and programming languages. (As a consequence, any and all such languages which provide for downloadable and executable code are individually and collectively referred to herein as "network languages" or "network programming languages", including languages such as Java and JavaScript.

Continuing to refer to FIG. 2, the requested web page may include special or designated keywords which are designed to invoke, call or specify a network programming language. For example, Java applications are invoked or called utilizing a keyword referred to as a "tag" and, more specifically, an "applet" tag ("<APPLET>"). (Other versions of HTML, such as HTML 4.0, are also designed to support a new tag referred to as an object tag ("<OBJECT>"), which is planned as an expansion or replacement of the applet tag; as a consequence, as used herein, reference to an applet tag shall also mean and include reference to other keywords or tags which invoke or call an executable network programming language, such as the object tag). A keyword such as an applet tag typically has required or desirable attributes, generally, a name or reference attribute, and an amount of space (height and width attributes) the applet will use when displayed. For the purposes herein, the keyword need only have a name or reference attribute that designates or otherwise corresponds to executable code, i.e., the name or reference attribute corresponds to or refers to the code (wherever located) which will be downloaded for execution when the keyword is invoked. As more specifically related to Java, a Java program to be downloaded and executed is in computer-readable bytecode form having a "class" extension, converted from Java source code using a Java compiler. As an object-oriented programming language, Java defines a "class" as a collection of data and methods (procedures or functions) which operate on the data. As a consequence, a Java applet utilizes, as such a reference attribute, a parameter known as "CODE" to name or designate the class of Java bytecode to be downloaded for execution by the web browser. In addition, and more generally, such Java bytecode may also be designated utilizing a parameter "CODEBASE" to specify a name and location of the class of Java bytecode residing on another server 130, i.e., residing on a server 130 other than the server providing the web page, or may be designated utilizing an archive parameter to specify an entire group of Java class files for faster, simultaneous downloading.

Continuing to refer to FIG. 2, when an end system 150 requests a web page, the web page is downloaded from a remote server 110 (through a local server 120), and typically contains text (formatted utilizing HTML), scripting, and network language keywords such as applet tags. When the end system 150 invokes a keyword such as an applet tag by, for example, mouse clicking on hypertext or a button of a graphical user interface, the browser transmits a request to the remote server 110 to download the requested applet, with the request having or containing a corresponding reference, such as the class name designated in the applet tag. The remote server 110 then transmits the corresponding requested code (and any requested data), and such code may then be executed by the browser of the end system 150, such as the JVM. As mentioned above, because executable code is downloaded from a potentially unknown or untrustworthy source, the Java architecture has been designed to prevent security breaches which may originate from a network, such as from a remote server 110, utilizing features such as the Java sandbox and the Java bytecode verifier. Also as mentioned above, the present invention provides for additional protection against security breaches that may originate locally, i.e., from a local end system 150 or from a local server 120.

More particularly with reference to Java as a particular network language, and as explained in greater detail below with reference to FIGS. 3 and 4, in accordance with the dynamic Java class naming of the present invention, when an end system 150 requests a web page from a server 130 (for example, from remote server 110), the server 130 generates a new web page in which all Java applets have new, distinct (or unique) class names, and stores the corresponding executable Java bytecode utilizing each applet's respective distinct (or unique) class name. Subsequently, in order for the end system 150 to request the executable Java bytecode, it must do so utilizing the new distinct (or unique) class name provided with the web page, and the corresponding executable bytecode is then downloaded at that time by the server 130. Because any other Java bytecode which may have been stored locally, i.e., at the end system 150 or the local server 120, will have been stored utilizing a previously generated and different name, such Java bytecode will not be unknowingly executed by the end system 150; rather, the JVM of the end system 150 instead will call the new, distinctively named Java bytecode which is only now available on the specific server 130 (such as remote server 110) and is not (yet) available on the end system 150 or the local server 120. The apparatus, method and system of the present invention thereby provide increased network security, because it is extremely unlikely that any previously and locally stored Java bytecode would have been stored utilizing a precisely identical name as the new, distinctive (or unique) class name (which had been separately and independently generated de novo and provided in the applet tag of the newly generated web page). For example, depending upon the degree of security desired, completely unique applet class names could be generated, for example, using a random generator; locally stored bytecode would be executed only if previously stored, in advance, using a priori knowledge of the randomly generated, unique class name, which is highly unlikely if not impossible. As a consequence, supposing that there were a physical security breach of an end system 150 in which rogue or malicious Java bytecode were stored locally, that locally stored bytecode would not be executed. Instead, the JVM of the web browser in the end system 150 will request and subsequently execute only the distinctively named bytecode. Therefore, despite the supposed physical security breach in which potentially rogue bytecode was stored locally, no further harm will follow from the unknowing, potential execution of Java bytecode by the JVM of the web browser, as the dynamic naming of the present invention helps to ensure that all such bytecode to be executed is freshly received de novo, presumably directly from a known or trusted source. The dynamic naming of the present invention thereby prevents unknowing execution of potentially rogue, locally stored bytecode.

Figure 3:
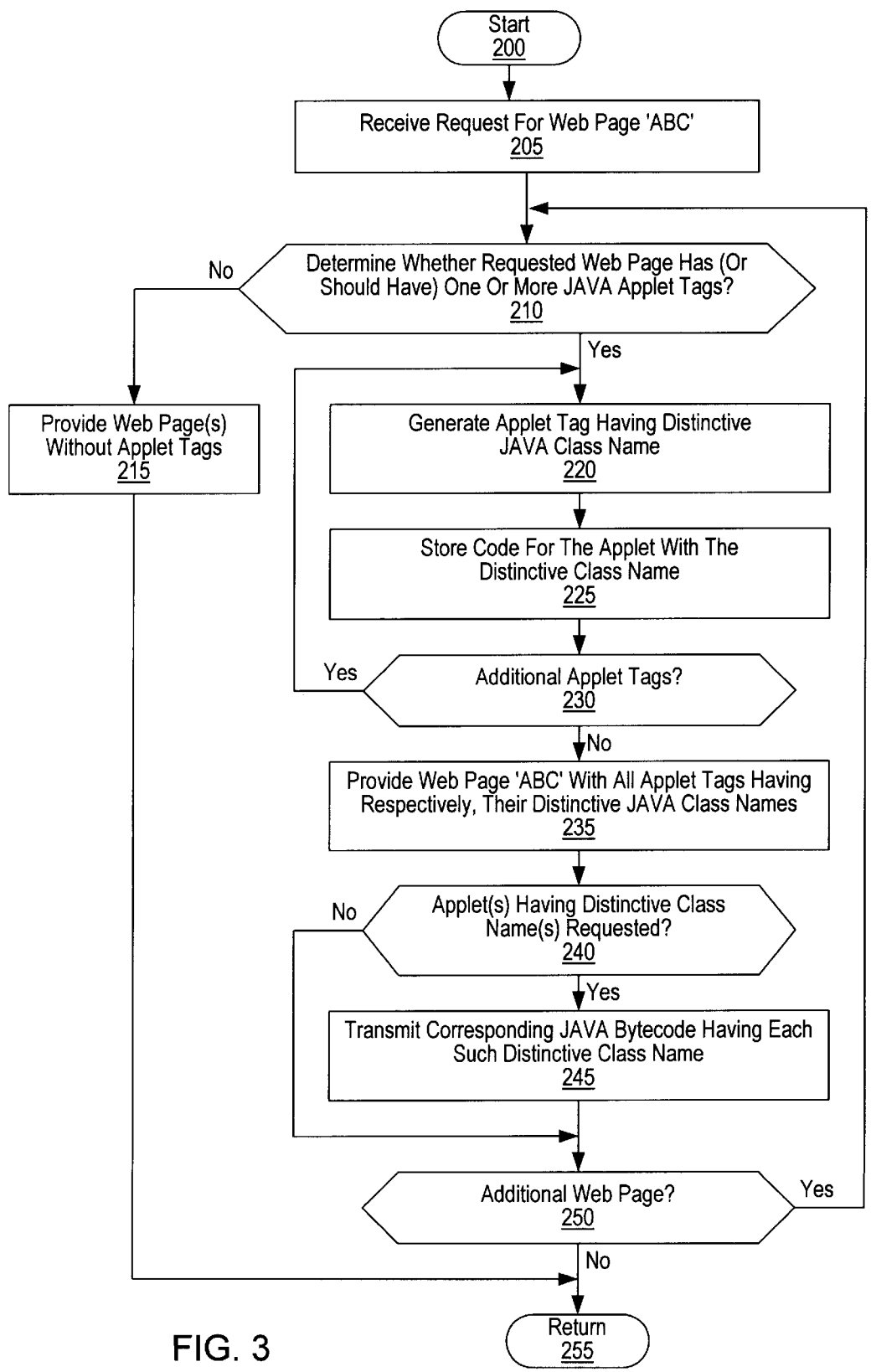
FIG. 3 is a flow diagram illustrating a preferred method embodiment in accordance with the present invention.
Figure 4:
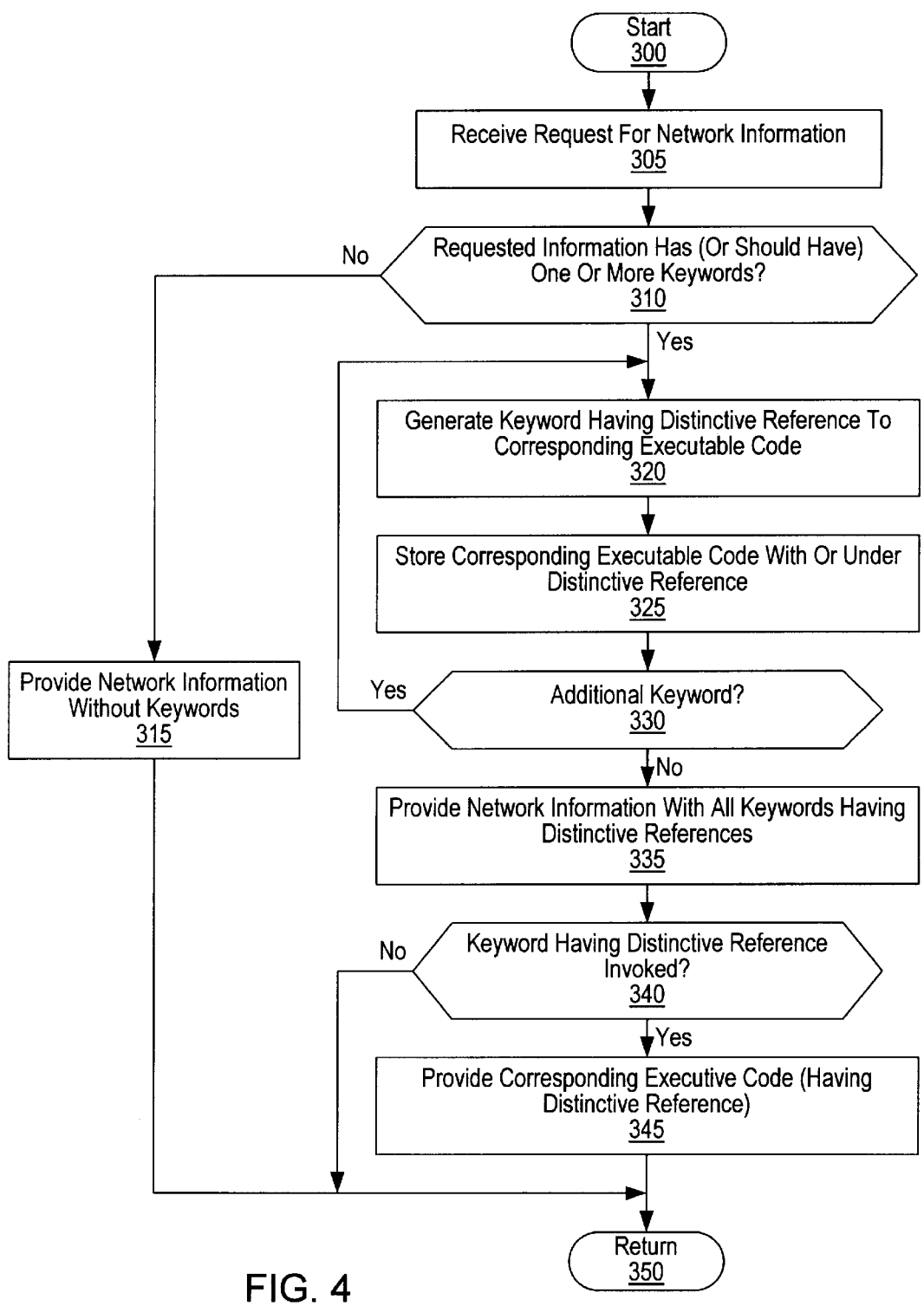
FIG. 4 is a flow diagram illustrating a general method embodiment in accordance with the present invention.

FIG. 3 is a flow diagram illustrating a preferred method embodiment in accordance with the present invention, namely, dynamic Java class naming as a preferred method of providing network security for executable code. Referring to FIG. 3, the method begins, start step 200, with receiving a request for a web page, such as web page "ABC", step 205. Such a request is typically transmitted by an end system 150 (through its web browser) and received by a remote server 110 (via a local server 120). Next, typically through the remote server 110, the method determines whether the requested web page has (or should have) one or more Java applet tags or other keywords designed to invoke or call executable code, step 210. When the requested web page does not require such applet tags, the requested web page may be provided, step 215, and the method may end, return step 255. When the requested web page does require one or more applet tags or other keywords in step 210, the method proceeds to step 220, and generates an applet tag having a new, distinctive or unique class name as the reference attribute, such as a required name, code, codebase or archive attribute. Next, in step 225, the method stores the bytecode for that applet with or under that same distinctive or unique class name. The method then determines whether additional applet tags are needed for the requested web page, step 230. When additional applet tags are needed in step 230, the method returns to steps 220 and 225, and proceeds to generate a second applet tag having a second distinctive or unique class name and to store the bytecode for the second applet with or under its second distinctive or unique class name. The method continues (loops) through steps 220 and 225 for each such additional applet, generating distinctive names and storing bytecode for such third, fourth, . . . to $n^{th}$ applets, until no more additional applets are required in step 230, and then the method proceeds to step 235. In step 235, the method generates and provides the requested web page with all of its applet tags having their respective new, distinct (or unique) class names. Subsequently, in step 240, when a request is received for one or more applets (applet classes or applet class packages) having its (or their) respectively distinct or unique class name(s), then in step 245, the method transmits the corresponding applet bytecode having each such distinct or unique class name. The transmitted, distinctively named applet bytecode may then be executed, for example, by the particular end system 150 that had requested it by its distinctive class name. Following steps 240 or 245, when one or more additional web pages are requested, such as web pages "DEF" or "GHI", step 250, the method is then repeated for each such additional web page, returning to step 210. When no more web pages are requested in step 250, the method may end, return step 255.

Not separately illustrated in FIG. 3, there are a wide variety of methods or procedures which may be utilized in step 220 to generate a keyword having a distinctive reference to executable code, such as an applet tag having a distinctive or unique class name. As mentioned above, depending upon the desired degree of security, the applet class names may be generated (by a server 130) either uniquely or distinctively for each web page access by each end system 150 browser. For example, for very high security, the applet class names may be newly and uniquely generated at the time the web page is requested, using a random generator or another methodology or algorithm that creates names which cannot be easily predicted in any manner. This random method may consume more processing time than is desirable for many applications, as it may require editing the applet class itself, and recompilation of the edited Java source code. While providing significant security, the potentially greater processing time of the random method may make other potentially less secure methods more desirable for a given application. For example, many consumer applications that do not involve significant security issues may require high speed for consumer satisfaction, such as the capability to dynamically load and transmit a page of text within ten seconds. Accordingly, another method may include generating a predetermined set of keyword references and corresponding executable code, such as a library of applet class names, of any desired size which, again, cannot be easily predicted in any manner. For example, libraries of hundreds to thousands of distinct or unique applet class names could be generated and stored in advance, along with the corresponding applet class bytecode. While potentially consuming more memory or storage capacity, this library method may provide both the desired degree of security and the desired processing timeliness, such that distinctively named applet tags are readily available for incorporation into the requested web pages, and the corresponding distinctively named applet bytecode classes are readily available for downloading when and if requested.

Also depending upon the desired level of security, the class names dynamically generated may be completely unique or highly distinctive for each and every web page access, or may have lesser distinctiveness or involve some amount of repetition, such that some names (and corresponding stored bytecode) may be reused periodically or simply reused on other occasions. For example, a library of thousands of names and corresponding code may be generated and periodically used for more than one web page access, under a security assumption that it is highly unlikely that a "hacker" could duplicate the entire library (or significant portion of the library) and locally store the corresponding code on an end system 150 or local server 120, without knowledge of the user or otherwise without discovery of the physical security breach. Where higher levels of security may be involved, completely unique class names may be desired.

As mentioned above, the scope of the present invention concerns providing additional security functionality for executable code which may be downloaded over a network, and is not limited to Java as a network programming language, to JavaScript as a scripting language, to HTML as a markup language, or to applet or object tags as keywords which invoke the downloading of the executable code. As a consequence, FIG. 4 is a flow diagram illustrating more generally a method of providing network security for executable code in accordance with the present invention, which may be utilized in this broader networking context for any and all types of downloadable, executable code. The method begins, start step 300, with receiving a request for network information, typically transmitted from an end system 150 to a remote server 110 or other system (as illustrated in FIG. 2). The network information may be in the form of a world wide web page, or may have any other type of format or content. Next, in step 310, the method determines whether the requested information has (or should have) one or more keywords which may invoke or call executable code such as, for example, the applet or object tags of Java. When the requested network information does or should not contain such keywords in step 310, the requested network information may be provided, step 315, and the method may end, return step 350. When the requested network information should contain a keyword in step 310, the method generates a keyword having a distinctive or unique reference to corresponding executable code, step 320, such as generating an applet tag having a distinctive Java class name which refers to corresponding executable Java bytecode. The corresponding executable code is stored with, under or accessible by the distinctive reference, step 325, such as storing corresponding Java bytecode with its distinctive class name. As mentioned above with regard to FIG. 3, such keyword generation of step 320 may be performed in a variety of ways, including random generation and predetermined set (library) formation. Following steps 320 and 325, the method determines whether additional keywords are required in the requested network information, step 330, and if so, repeats steps 320 and 325 for each such additional keyword, generating distinctive references and storing corresponding code for each keyword. When no additional keywords are needed in step 330, the method provides the network information with all keywords having their respective, distinct references, step 335, such as providing a web page with all applet or object tags having their respective, unique applet class names. Subsequently, when a request having the distinctive reference is received, step 340, the method provides the corresponding executable code, step 345, such as providing corresponding Java bytecode for execution by a JVM of a web browser. Following steps 315 and 345, or when no requests are received in step 340, the method may end, return step 350.

Figure 5:
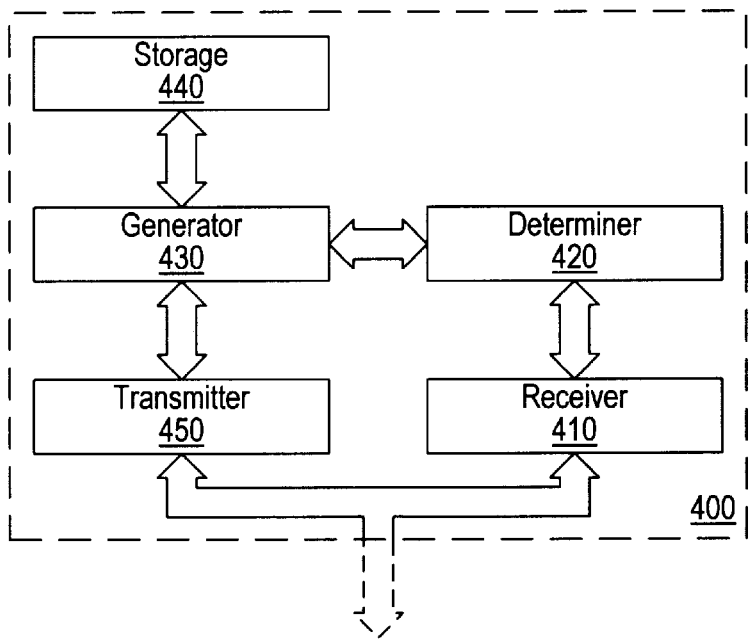
FIG. 5 is a block diagram illustrating an apparatus embodiment in accordance with the present invention.

FIG. 5 is a block diagram illustrating an apparatus 400 in accordance with the present invention. As mentioned above, in the preferred embodiment, the apparatus 400 is contained, included or embodied within a system such as a server 130, or more specifically, a remote server 110 or local server 120; such a system may also include additional memory 145 or other storage capacity. Referring to FIG. 5, the apparatus 400 includes a receiver (or means for receiving) 410, a determiner (or means for determining) 420, a generator (or means for generating) 430, storage (or means for storage) 440, and transmitter (or means for transmitting) 450. As discussed in greater detail below, the apparatus 400 has the states and performs the methods illustrated in FIGS. 1, 3 and 4. The receiver 410 and the transmitter 450 may be any input and output (I/O) interfaces, respectively, which are appropriate for the desired or selected network channel, such as a T1 interface when coupled to the network 180 via a T1 telecommunications line, a suitable ISDN line interface, a coaxial cable or fiber optic interface, or an analog interface. The receiver 410 and the transmitter 450 are utilized for, respectively, the reception and transmission of information, code, requests and other messages, typically in packet-based formats, such as internet protocol packets. For example, the receiver 410 is utilized for the reception of requests for web pages or other network information, and the transmitter 450 is utilized for transmission of requested web pages and for transmission of executable code, such as Java bytecode. The storage 440 is typically a memory system such as an electromagnetic hard drive. The storage 440 may be any form of electromagnetic, optical, or other type of storage or memory component, and may be included within the memory 145 for system embodiments (rather than considered a separate component of an apparatus 400). In the preferred embodiment, as discussed in greater detail below with reference to FIG. 6, the determiner 420 and the generator 430 are embodied in a processor, such as a microprocessor, a digital signal processor, an application specific integrated circuit ("ASIC"), or a grouping of such processors or ICs.

Continuing to refer to FIG. 5, when the receiver 410 receives a request for network information (typically transmitted from an end system 150), such as a request for a web page, the determiner 420 determines whether the requested information has (or should have) one or more keywords which may invoke or call executable code such as, for example, the applet or object tags of Java. When the requested network information does not contain such keywords, the determiner 420 instructs the generator 430 to provide the requested network information, which in turn is transmitted by the transmitter 450 (to an end system 150, via the various routers 125 and servers 130). When the requested network information should contain a keyword, the determiner 420 instructs the generator 430 to generate a keyword having a distinctive or unique reference to corresponding executable code, such as generating an applet tag having a distinctive Java class name which refers to corresponding executable Java bytecode. The generator 430 also stores the corresponding executable code in the storage 440 with, under, or accessible by the distinctive reference, such as storing corresponding Java bytecode with its distinctive class name. As mentioned above with regard to FIGS. 3 and 4, such keyword generation may be performed in a variety of ways by the generator 430, including random generation and library (predetermined set) formation. The determiner 420 then determines whether additional keywords are required in the requested network information, and if so, instructs the generator 430, for each such additional keyword, to generate distinctive references and store (in storage 440) corresponding executable code for each keyword. When no additional keywords are needed, the generator 430 provides (for network transmission by the transmitter 450) the network information with all keywords having their respective, distinct references, such as providing a web page with all applet or object tags having their respective, unique applet class names. Subsequently, when a request having the distinctive reference is received by the receiver 410, as determined by the determiner 420, the generator 430 provides (also for network transmission by the transmitter 450) the corresponding executable code, such as providing corresponding Java bytecode for execution by a JVM of a web browser.

Figure 6:
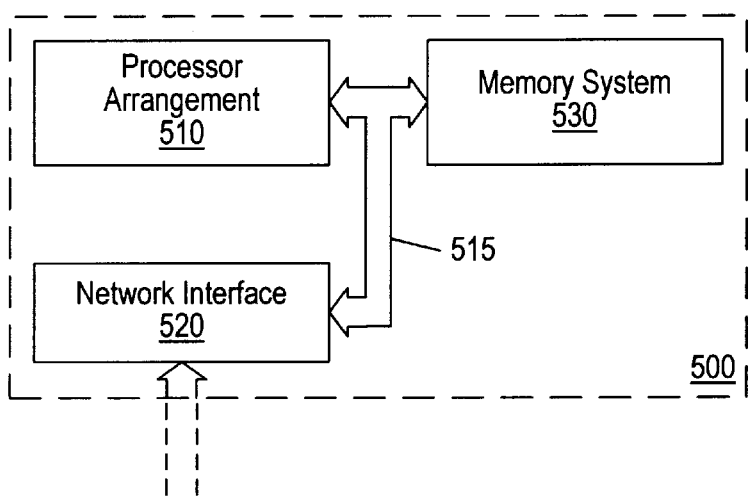
FIG. 6 is a block diagram illustrating a preferred apparatus embodiment in accordance with the present invention.

FIG. 6 is a block diagram illustrating a preferred apparatus 500 in accordance with the present invention. As mentioned above, in the preferred embodiment, the apparatus 500 is contained, included or embodied within a system such as a server 130, or more specifically a remote server 110 or local server 120; such a system may also include additional memory 145 or other storage capacity. Referring to FIG. 6, the apparatus 500 includes a network interface 520, a processor 510, and a memory system 530. The network interface 420 may be any input and output (I/O) interface appropriate for the desired or selected network channel, such as a T1 interface when coupled to the network 180 via a T1 telecommunications line, a suitable ISDN line interface, a coaxial cable or fiber optic interface, or an analog interface. The network interface 520 is utilized for the reception and transmission of information, code, requests and other messages, typically in packet-based formats, such as internet protocol packets, (and performs the functions or the receiver 410 and transmitter 450 discussed above with reference to FIG. 5). For example, the network interface 520 is utilized for the reception of requests for web pages or other network information, for transmission of requested web pages, and for transmission of executable code, such as Java bytecode. The memory system 530 may be any form of magnetic, optical, or other type of storage or memory component, and may be included within the memory 145 for system embodiments (rather than considered a separate component of an apparatus 500). A processor 510 is coupled to the network interface 520, via a bus 515 (such as a PCI bus), and may also be coupled to the memory system 530 (when such memory system 530 is separately included in the apparatus 500 rather than included in the memory 145 which may be connected to a server 130). The processor 510 may include a single integrated circuit ("IC"), or may include a plurality of integrated circuits or other components connected, arranged or grouped together, such as microprocessors, digital signal processors, ASICs, associated memory (such as RAM and ROM), and other ICs and components. As a consequence, as used herein, the term processor should be understood to equivalently mean and include a single processor, or arrangement of processors, microprocessors, controllers, or some other grouping of integrated circuits which perform the functions discussed in greater detail below, with associated memory, such as microprocessor memory or additional RAM, ROM, EPROM or E$^2$PROM. The processor 510 performs the functions of the determiner 420 and the generator 430 discussed above with reference to FIG. 5. Also as discussed above with reference to FIGS. 3 and 4, the methodology of the invention may be programmed and stored, as a set of program instructions for subsequent execution, in the processor 510 with its associated memory and other equivalent components.

In the preferred embodiment, the network interface 520 is operative to receive requests for network information, such as requests for web pages, and is operative to transmit network information, such as web pages and executable code. The processor 510 is responsive through a set of program instructions, when operably coupled (i.e., turned on and powered up), to determine whether requested network information has (or should have) one or more keywords which may invoke or call executable code such as, for example, the applet or object tags of Java. When the requested network information does not or should not contain such keywords, the processor 510 is responsive to provide the requested network information, which in turn is transmitted by the network interface 520 (to an end system 150, via the various routers 125 and servers 130). When the requested network information should contain a keyword, the processor 510 is responsive to generate a keyword having a distinctive or unique reference to corresponding executable code, such as generating an applet tag having a distinctive Java class name which refers to corresponding executable Java bytecode, and to store the corresponding executable code in the memory system 530 with, under, or accessible by the distinctive reference, such as storing corresponding Java bytecode with its distinctive class name. As mentioned above with regard to FIGS. 3 and 4, such keyword generation may be performed in a variety of ways by processor 510, including random generation and predetermined set (library) formation. The processor 510 is then responsive to further determine whether additional keywords are required in the requested network information, and if so, the processor 510 generates the distinctive references and stores the corresponding executable code for each such keyword in the memory system 530. When no additional keywords are needed, the processor 510 is responsive to provide (for network transmission by the network interface 520) the network information with all keywords having their respective, distinct references, such as providing a web page with all applet or object tags having their respective, unique applet class names. Subsequently, when a request having the distinctive reference is received by the network interface 520, as determined by the processor 510, the processor 510 is responsive to provide (for network transmission by the network interface 520) the corresponding executable code, such as providing corresponding Java bytecode for execution by a JVM of a web browser.

Numerous advantages of the various embodiments of the present invention may be readily apparent. First and foremost, the present invention prevents the unknowing or innocent execution of a rogue applet or other "Trojan Horse" network language program or application. As a consequence, assuming that the physical security of a local end system occurred in order to plant a rogue program, no further harm will result from utilization of the network language program, such as a Java applet. For example, given the dynamic Java class naming of the present invention, in the event a rogue applet were stored locally, the rogue applet will not be executed; rather, a different Java class name will be generated by the server, which is then correspondingly called or invoked by the end system for the same functionality (or object-orientation).

Another advantage of the present invention is its ease of implementation. The present invention is preferably embodied as a set of program instructions residing within a network server, and does not require any change of hardware or any additional hardware. As a consequence, the present invention may be implemented with significant cost savings.

Yet another advantage of the present invention is its user transparency. The present invention may be implemented within a network server, and no changes, additions, or instructions are needed within a local end system. Moreover, the user may benefit from this additional security feature any knowledge of its operation, without needing to enter any commands or instructions, and without any inconvenience.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

I claim:

1. A system for providing network security for executable code, the system comprising:

a network interface coupleable to a network communications channel for the reception and transmission of network information;

a processor coupled to the network interface, the processor responsive when operative, through a set of program instructions, to determine whether the network information includes a first network language keyword; when the network information includes the first network language keyword, the processor further responsive to generate a first distinctive reference to a first corresponding executable code, and to provide, for transmission by the network interface, the network information in which the first network language keyword incorporates the first distinctive reference; and when the first network language keyword incorporating the first distinctive reference is invoked, the processor further responsive to provide, for transmission by the network interface, the first corresponding executable code; and a memory coupled to the processor for storing the first corresponding executable code.

2. The system of claim 1, wherein the processor is further responsive, when the network information has a plurality of network language keywords, to generate a plurality of respective, distinctive references to a corresponding executable code; to provide, for transmission by the network interface, the network information in which each network language keyword of the plurality of network language keywords incorporates a respective, distinctive reference; and the processor further responsive, when a network language keyword incorporating a respective, distinctive reference is invoked, to provide, for transmission by the network interface, the corresponding executable code.

3. The system of claim 2 wherein the processor is further responsive to generate multiple pluralities of network language keywords, each plurality of the multiple pluralities of network language keywords corresponding to a separate request for network information, and wherein each network language keyword of each plurality of network language keywords includes a respective, distinctive reference to a corresponding executable code.

4. The system of claim 1 wherein the requested network information is a world wide web page, wherein the first network language keyword is an applet tag, wherein the first distinctive reference is a Java class name, and wherein the first corresponding executable code is Java programming language bytecode.

5. The system of claim 1 wherein the system is embodied with a server.

6. The system of claim 1 wherein the first network language keyword is an object tag.

7. The system of claim 1 wherein the first network language keyword is an HTML keyword.

8. The system of claim 1 wherein the first network language keyword is a scripting language keyword.

9. The system of claim 1 wherein the processor further executes instructions to randomly generate the first distinctive reference.

10. The system of claim 9 wherein the first network language keyword is an object tag.

11. The system of claim 9 wherein the first network language keyword is an HTML keyword.

12. The system of claim 9 wherein the first network language keyword is a scripting language keyword.

13. The system of claim 1 wherein the processor further executes instructions to select the first distinctive reference from a set of predetermined distinctive references.

14. The system of claim 13 wherein the first network language keyword is an object tag.

15. The system of claim 13 wherein the first network language keyword is an HTML keyword.

16. The system of claim 13 wherein the first network language keyword is a scripting language keyword.

17. A method of providing dynamic class naming for Java bytecode, the method comprising:

(a) receiving a request for a web page;

(b) determining whether the web page includes a first applet tag;

(c) in response to the presence of the first applet tag, generating a first distinctive applet class name for the first applet tag and storing first corresponding Java bytecode having the first distinctive applet class name;

(d) in response to the presence of a plurality of applet tags, generating a corresponding distinctive applet class name for each applet tag of the plurality of applet tags, and storing a corresponding plurality of Java bytecode each having its corresponding distinctive applet class name;

(e) providing the web page in which all applet tags include their corresponding distinctive applet class names; and (f) when any applet tag incorporating its corresponding distinctive class name is invoked, providing the corresponding Java bytecode.

18. An apparatus for dynamic class naming for Java bytecode, the apparatus comprising:

means for receiving a request for a web page;

means for determining whether the web page includes a first applet tag;

means for generating, in response to the first applet tag, a first distinctive applet class name for the first applet tag;

memory means for storing first corresponding Java bytecode having the first distinctive applet class name;

means for generating, in response to a plurality of applet tags, a corresponding distinctive applet class name for each applet tag of the plurality of applet tags;

memory means for storing a corresponding plurality of Java bytecode each having its corresponding distinctive applet class name;

means for providing the web page in which all applet tags have their corresponding distinctive applet class names; and means for providing the corresponding Java bytecode when any applet tag incorporating its corresponding distinctive class name is invoked.

19. A system for dynamic class naming for Java bytecode, the system comprising:

a local end system, the local end system responsive through a set of program instructions, when operative, to transmit a request for a web page and to invoke an applet tag; and a remote server coupleable through a network to the local end system, the remote server, responsive through a set of program instructions, when operative, to receive a request for a web page and to determine whether the web page includes an applet tag; in response to the presence of the applet tag, the remote server further responsive to generate a distinctive applet class name for the applet tag and to corresponding Java bytecode having the distinctive applet class name; the remote server further responsive to provide the web page to the local end system in which the applet tag includes the distinctive applet class names, and to provide the corresponding Java bytecode in response to an invocation by the local end system of the applet tag incorporating the distinctive class name.

* * * * *